Patented Aug. 14, 1945

2,382,407

UNITED STATES PATENT OFFICE 2,382,407

EXTRACTION PROCESS

Arvid M. Erickson, San Jose, and John D. Ryan, Campbell, Calif., assignors to Barron-Gray Packing Company, San Jose, Calif., a corporation of California No Drawing. Application February 12, 1942, Serial No. 430,613

15 Claims. (Cl. 99—105)

This invention relates to a method for separating liquid from solid materials. More particularly, it relates to a method for separating from fruit material a liquid including the sweetening ingredients of the fruit.

The art of extracting and purifying sugar from sugar-cane and sugar-beets in particular, although far from perfection, has long since passed the stage where it became commercially practical. The sucrose sugar obtained from these sources is, however, known to be inferior to other sugars as a means of sweetening food, at least in some respects. For example, certain persons who are unable to eat substantial quantities of sucrose suffer no ill effects from the consumption of like quantities of other sugars, such as those which form by far the larger part of the natural sugar content of fruit.

With the foregoing in mind efforts have been made to extract sugar from fruit or to prepare a sweetening medium from fruit with the result that methods have been developed for producing a sugar bearing liquid which is to some extent refined, but no practical commercial method has heretofore been devised for producing a real sweetening medium from fruit. The methods developed have been not only impractical but have led to products which contain objectionable impurities in the form of acids or bitter salts.

By way of illustrating the difficulties, it is pointed out that the juice of fruits is not only more difficult to extract from the pulp than is the juice of sugar-cane and beets, but, in addition, methods suitable for purifying the juice of sugar-cane and beets, which contains sucrose as the principal sugar constituent, are not satisfactory for purifying fruit juices which contain, as their principal sugar constituents, the sugars naturally occurring in fruit. It appears that the organic acids and non-sugars in fruit juices, which are of a different type from those found in cane and beet juices, have a tendency to retain the sugar in the pulp and to oppose its release by pressing. It further appears that the cells in the fruit which contain the sugar are smaller and that the walls of the cells are of a more gelatinous construction, which is somewhat elastic, so that pressing instead of rupturing the cell merely compresses it and forms a slime or smooth, creamy mass instead of producing a clean break of the juice. The juice thus cannot be satisfactorily extracted by diffusion alone.

A sugar-bearing juice has been extracted from fruit pulp with diatomaceous earth for the purpose of providing a sweetening medium for fruit but the results were not satisfactory. The pump residue remaining after the earth treatment is of no value as a feed, due to its objectionable earth content, and in addition the method is expensive, and many impurities are carried along in the sugar-bearing liquid extracted, so that it is not a sweetening medium particularly with respect to fruit since it includes the materials of the fruit which detract from the sweetening power of the sugars present and is thus no sweeter itself than fruit.

The term "sweetening medium" is used frequently herein. This term as used herein means just what the name signifies, i. e., it is a sugar containing medium which is substantially free of materials which detract from the sweetening power of the sugars present, such as acids and ash-forming materials, although it may contain substantial quantities of inert diluents.

It is an object of this invention to provide an improved method for extracting from fruit material, whole or waste or any other form, the sweetening ingredients thereof.

A more specific object is to provide an improved method for separating from fruit material the sweetening ingredients thereof in the form of an aqueous solution which can be readily processed to convert it into a sweetening medium.

A further object is to provide a method by which water-soluble constituents of fruit may be readily separated from the water-insoluble constituents of the fruit, in accordance with which method the separation of the water-soluble sweetening ingredients of the fruit is substantially complete and the separated water-soluble constituents are obtained in the form of an aqueous solution.

Another object is to provide a method for separating from fruit pulp the sugar-bearing juices of the fruit.

A still further object is to provide a process for treating fruit material which has been ground to a fine pulp to cause the pulp to release a sugar-bearing juice.

Still another object is to provide a process for treating a fine juicy fruit pulp to put it into a condition such that it may be readily separated by a simple filtration step into an insoluble portion and a liquid portion containing substantially all the sweetening ingredients of the fruit.

Another object is to cause fruit juice to flow out of the pulp freely during filtration of pulped fruit material.

A still further object is to provide a process for separating sweetening ingredients of fruit from the insoluble solid portions thereof in such a manner that the insoluble solids, as well as the sweetening ingredients, may be recovered in a useful form.

A still further object is to provide a process for treating a fine, juicy fruit pulp to simultaneously precipitate water-soluble impurities and put the pulp into a condition such that it may be readily separated by a simple filtration step into an insoluble portion and a liquid portion containing substantially all the sweetening ingredients of the fruit.

Still another object is to provide a process for separating sweetening ingredients of the fruit from the insoluble solid portions thereof, with the aid of little or no added chemical reagents, whereby the extraction process is made more economical.

Other objects will appear hereinafter.

It has now been found that the foregoing objects may be accomplished by adding a substantial quantity of fibrous material to the fruit prior to filtration and pressing. Such treatment may be applied to fruit generally, particularly, non-citrus fruit, such as raw fruit, for example, peaches, apples, pears, grapes, and the like, or dried fruit such as raisins or prunes or the waste from fruit packs, such as the wastes from packing peaches, pears, apples, grapes, etc., or the waste from packing mixed fruit, known as fruit salad, or fruit cocktail, or other fruit wastes or mixtures of two or more of the foregoing.

Whereas such fruit even when ground to a fine pulp and thinned with water does not release the juice present in the fruit but instead when pressed forms a slime or smooth creamy mass from which the juice does not flow, it has been found that in the presence of substantial quantities of fibrous material the juice breaks out of the fruit cleanly on pressing so that the juice and sweetening ingredients of the fruit can be separated substantially completely from the solid pulp by filtering and washing the last portions of the juice including the sweetening ingredients out of the filter cake with a suitable solvent, such as water. The presence of the fiber in the pulp mass apparently changes the nature or consistency of the mass sufficiently to permit the juice to flow out freely where it otherwise would not.

This substantially complete separation of the juice containing substantially all the sweetening ingredients of the fruit is, moreover, accomplished without creating additional difficulties in the further treatment of the juice to produce a sweetening medium therefrom.

The added fibrous material, however, not only facilitates juice extraction but also enhances the value of the pulp residue for by-product purposes, such as animal feed, fertilizer, etc., particularly where the fibrous material is sorghum, sugar-cane, sugar-beets, etc. The latter materials thus possess a double advantage since they also contribute their quota of sugar to the product.

In accordance with the preferred form of the invention, the fruit is first ground to a fine pulp in a suitable pulper of which a number are available. If the fruit material, as is usually the case, does not contain sufficient liquid to insure complete extraction of the sweetening ingredients, it is preferable to add water although its addition may be omitted if desired. The water may be added at any time prior to filtration but when added prior to grinding the fruit in addition to aiding extraction of the sweetening ingredients it also aids the grinding and helps to prevent air oxidation of the ground fruit.

It will be apparent that the presence of excessively large quantities of water in the pulp unnecessarily increases the quantity of liquid which must be handled and that on the other hand where only a very small quantity of water is present, the pulp mixture may be so thick that it does not heat readily and in addition there is the danger that a substantial portion of the sweetening ingredients will remain with the pulp and will not be extracted. Accordingly, the preferred quantity of water to have present in the fruit material is the minimum quantity capable of extraction substantially all of the sweetening ingredients from the material being treated and to this end the preferred quantity to add is just about the quantity necessary to increase the water content of the pulp mixture to the preferred amount. It is within the scope of the invention, however, to add amounts of water both greater and less than the preferred amounts. The quantity of water to be added in any given case to increase the amount present to the preferred amount will vary considerably, depending upon the nature of the fruit material. A small amount of water on the order of about 10 per cent by weight based on the weight of the fruit is usually sufficient in the case of fruit of normal water content, but if the fruit being treated is dried fruit, the quantity of water which is preferably added will be much greater, being of the order of about 300 per cent by weight, based on the weight of the fruit.

The fibrous material employed may be a non-sugar bearing fibrous material, such as straw, but the preferred fibrous materials are those, such as sorghum, sugar-cane, beets, etc., which themselves contain sugar or sweetening ingredients. Where the fibrous material added is itself sugar bearing, it not serves to incorporate fibrous material in the pulp mixture but at the same time adds its quota of sugar to the extracted juice. Sugar bearing fibrous material is particularly preferable from the economic standpoint. Preferably, the amount of fibrous material added is of the order of from about 8 per cent to about 30 per cent by weight, based on the weight of the pulp but the amount added may vary considerably above and below these amounts, if desired.

It is also preferable to employ a fibrous material which does not introduce any impurities which require special treatment for their removal. By way of illustration, it has been found that sorghum having a sugar content of about 17 degrees Brix when combined with fruit pulp makes a splendid pressing vehicle. Adding its quota of sugar to the extracted juice, it also improves for by-product purposes the pulp residue from the extraction step and has the further advantage of containing small, but nevertheless appreciable, amounts of phosphoric acid, which latter acid is a preferred acid to add to the extracted juice during the purification thereof.

The fibrous material is prefrably ground or macerated prior to adding it to the fruit or fruit pulp since a much more powerful grinder is required for the fibrous material than is required for the fruit itself. The fruit and fibrous material may, however, be ground together in the same grinder. Where the fibrous material is ground separately it may be mixed after grinding with the fruit pulp or with the fruit itself so that it is present during the grinding of the latter and becomes thoroughly admixed therewith.

It is within the scope of the invention, however, to bring the fibrous material and the fruit together either before or after the grinding of either or both. Particularly in the case where the fruit and fibrous material are ground separately and then mixed, the resulting mass is preferably agitated prior to pressing in order to insure thorough admixture of the fruit and fiber.

While the fibrous material alone will cause the juice to flow out of the pulp freely under pressure and bring about a substantially complete extraction of the sweetening ingredients of the fruit, it has been further found that the presence of certain divalent alkaline materials along with the fibrous material results in a still more efficient juice extraction. Therefore, the use of the two together is preferred. Where the two are used together, lesser quantities of each may be employed. It appears that the alkaline material aids in breaking down the cell walls and increases the solubility of the desired sugars in the extraction liquid and that the fibrous material in the mass promotes the flow of the juice by serving as an excellent pressing vehicle.

The alkaline material when employed with the fibrous material as an extraction aid, is added in amounts sufficient to materially increase the pH of the pulp mixture and to promote juice extraction but not in a quantity sufficient to give the extracted juice a pH in excess of about 9. The actual amount of alkaline material within this range which is ordinarily employed along with the fibrous material is substantially less than the amount ordinarily employed when the alkaline material is used alone as an extraction aid as described in applicants' co-pending application, Serial No. 413,164, filed October 1, 1941.

The alkaline material, like the fibrous material, aids in bringing about the separation of the sweetening ingredients without creating additional difficulties in the further treatment of the juice to produce a sweetening medium therefrom, provided the quantity added does not exceed that specified above. In addition, it actually enhances the value of the pulp particularly for use as fertilizer and brings about the precipitation of some water-soluble impurities which are thus left behind with the insoluble portions of the pulp. Also, the alkaline material present in the juice as a result of such treatment is desirable rather than undesirable because more alkaline material at least of the same type is added to the juice in preparing a sweetening medium therefrom.

While the alkaline material may be added at any time prior to the filtration step, it is preferable to add it following the grinding of the fruit to a fine pulp and to thoroughly agitate the mass during and after the addition of the alkaline material. One exception to this general rule occurs where the fruit material has a very low water content and the alkaline material is diluted with a large quantity of water to supply a substantial portion of the water required to extract the sweetening ingredients of the fruit, in which case it is preferable to add the alkaline material prior to grinding.

The addition of the alkaline material after grinding is generally preferable because at this stage it can be better distributed in the ground fruit and with the aid of agitation during and after the addition of the alkaline material local high concentrations thereof with resulting discolorations may be avoided. Where the solution of alkaline material is very dilute and the fruit is low in water content, local high concentrations of alkaline material do not occur even without uniform distribution and the advantage of having added water present during grinding makes the addition prior to grinding preferable.

The water to be added as described above need not be pure water and need not be added as such. For example, instead of adding relatively pure water, the water added may contain other materials which are not undesirable. Thus, the water derived from washing the solid materials from which the solution of sweetening ingredients has been separated in accordance with this invention, or from washing the impurities precipitated out of the extracted juice in the process of preparing a sweetening medium therefrom, may be used. The use of this water has the advantage that the sweetening ingredients of the wash water are recovered without diluting the juice or sweetening medium with the washings.

Another advantageous way to add water is with the alkaline material in the form of a solvent for the alkaline reagent. It is preferable in any case to add the alkaline reagent in the form of an aqueous solution. Preferably, also, this solution is made relatively dilute so as to avoid producing high concentrations of alkaline material at any point in the mass. It will be apparent that the more dilute the alkaline material is when added, the less danger of such high concentrations. By way of illustration, it is pointed out that while satisfactory results have been obtained with alkaline reagent solutions having concentrations as high as 10 per cent, it is preferable that the concentrations of these solutions shall not exceed about 6 per cent. It may be noted that in the case of solutions of alkaline material having concentrations of the order of 6 per cent, the amount of water added with the alkaline material, as compared with that present in the mass of fruit material is practically negligible since the quantity of 6 per cent lime solution ordinarily added to the pulped fruit, is of the order of one gallon per ton of water in the pulped fruit.

Suitable alkaline materials are those which can be readily eliminated from the liquid at a later stage of the process, particularly where the extracted juice is to be converted into a sweetening medium. It is also preferable that the alkaline material be one which is capable of precipitating undesired impurities, particularly if a sweetening medium is to be made from the juice. While alkaline materials, both organic and inorganic, or other materials adapted to increase the pH, may be used, the oxides and hydroxides of the alkaline earth metals and magnesium, such as the oxides and hydroxides of barium, calcium, magnesium, and strontium, and particularly lime, have been found to be especially suited since these are readily eliminated at a later stage, where that is desirable, and since further quantities of such divalent alkaline materials are added during the defecation of the extracted juices to prepare a sweetening medium therefrom.

As pointed out in the co-pending application above referred to, a given pulp will in general have an optimum pH on the alkaline side at which a maximum of juice may be extracted without substantial loss due to saccharation and without substantial darkening of the juice. In the presence of the fibrous material, however, sufficient alkaline material to increase the pH to this point has not been found to be necessary. While quantities of alkaline material in excess of those necessary to secure the desired result may be used, it has been found to be undesirable to add a quantity of alkaline material large enough to give the expressed juice a pH in excess of about pH 9. The reason for this is that where the pH of the expressed juice is appreciably in excess of 9, substantial reaction of sugar with the alkaline material, such as lime, to form insoluble saccharates takes place and under these conditions substantial quantities of the sugar are left behind in the pulp in the form of insoluble compounds. Where the pH of the extracted juice does not exceed 9, however, little or no sugar is left behind although substantial quantities of impurities are precipitated and left in the pulp.

Particular attention is called to the fact that so far as saccharation is concerned it is the pH of the expressed juice which is important and not that of the pulp. While there is a relationship between the pH of the pulp and that of the juice expressed from it in a given case the pH of the pulp prior to pressing is usually substantially higher than that of the expressed juice. This is believed to be due to the fact that in the pulp mixture certain acidic materials of the fruit are held in such fashion that they do not go into solution except upon pressing the pulp and upon going into solution during pressing react with the alkaline material reducing the pH.

Different fruits from different localities, as well as different mixtures of fruits, frequently require different treatment. For this reason it is generally desirable, in the case of a new batch of fruit, to take a small portion thereof and grind it to a fine pulp, adding water if necessary and also adding the quantity of ground fibrous material to be employed. This mixture may then be divided into a number of small portions and the alkaline material added thereto in amounts increasing with successive portions sufficiently to give each succeeding portion a pH which is five-tenths higher than that of the previous one. The various samples are then pressed to extract the juice. In this manner the minimum pH at which maximum extraction is obtained may be readily determined.

The addition of minimum quantities of alkaline material is desirable because even when the juice has a pH below about 9 so that no substantial loss due to saccharation occurs, the juice may nevertheless be given an undesirable color by the alkaline material. It is generally true that the more alkaline material added the more danger there is of giving the juice a color which it will be difficult to remove.

To further aid the pressing or filtering operation, the pulp mixture including the fibrous material and also the alkaline material and water when either or both of the latter two are added is preferably heated to a temperature not in excess of about 170 degrees Fahrenheit prior to the pressing or filtering. Higher temperatures tend to break down certain impurities such as maltic or various other organic acids which may be present and to give a permanent discoloration to the extracted juices.

Very good results have been obtained with temperatures appreciably below 170 degrees Fahrenheit. For example, excellent pressing and extraction of sugar bearing juices has been obtained when the pulp mixture was heated to from about 150 degrees Fahrenheit to about 160 degrees Fahrenheit for about five minutes prior to the pressing or filtering and this was accomplished without bringing into the extracted juice various organic acids and without breaking down impurities and permanently discoloring the extracted juices.

The time of heating may vary somewhat both above and below the five minutes mentioned above, particularly with variations of heating temperatures being in general less as the heating temperature increases. The heating may be omitted in fact, if desired, although it has been found that best results are obtained if the heating is continued for at least five minutes at 150 degrees Fahrenheit to 160 degrees Fahrenheit, which period represents the preferred minimum at these preferred temperatures so that longer heating times are not intended to be excluded from the scope of the invention.

Immediately following the heating of the pulp mixture as described, the pulp is pressed in a filter press, centrifuged or otherwise subjected to pressure to free the juice. In order to obtain maximum extraction of the sweetening ingredients, the solid material which is filtered out is preferably washed with a suitable material, such as water, until the washings coming through contain less than about 2 per cent sugars. Any tendency for the wash water to redissolve any precipitated impurities during washing may be prevented at least to a large extent by adjusting the pH of the wash water to the same pH as that of the extracted juice. These washings, or "sweet water" may either be added to the juice or returned into the process again for addition to a fresh batch of pulp in order to bring up the water content thereof to the desired point, as described above.

The juice as extracted is in a form in which it is particularly suited, as indicated above, for further processing to produce a sweetening medium in the form of a syrup. Accordingly, it may be given further treatment immediately to convert it into a sweetening medium or it may be stored or put to other uses for which it is suited.

The proportion of the sugars present in the original fruit material which is recovered by the present process is extremely high. It has been found by analysis of the separated juices that these juices contain in excess of 90 per cent, and frequently in excess of 95 per cent, of the sugars originally present in the fruit. In some cases as much as 97 per cent or 98 per cent of the sugar present in the fruit has been recovered in the juice. The present process is thus a highly effective method for extracting sweetening ingredients from fruit, resulting, as is apparent from the above, in the recovery in most cases of substantially all the sweetening ingredients or sugars originally present in the fruit, and in all cases of a very high percentage of these sweetening ingredients.

The filter cake or pulp remaining after the complete extraction of the sugar bearing juice is also useful as pointed out above. It may be dried and used for various purposes, such as, for example, feed, fertilizer filler, etc. It is substantially free from any sugar and will not ferment and form acetic acid and thereby sour the soil to which it is applied. Alkaline materials particularly lime are also desirable constituents of fertilizer and therefore when lime is employed, its presence in the pulp enhances the value of the pulp for use as fertilizer.

Many of the advantages of the present invention will be apparent from the foregoing description. Whereas the application of substantial pressure to finely ground fruit pulp instead of producing a clean break of the juice even in the presence of added water presses out only a small portion and forms a slime or smooth creamy mass retaining the sweetening ingredients, the addition of divalent alkaline material causes the juice to break cleanly out of the pulp on pressing. This is accomplished as pointed out above without introducing into the juice any undesirable materials or at least it does not introduce into the juice any foreign material which cannot be readily removed thereafter. At the same time if sufficient water is present substantially all the sweetening ingredients or sugars in the fruit material treated are carried out in dissolved form in the expressed juice.

As described above, any undesirable material introduced by the inclusion of the fibrous material in the pulp mixture or by the inclusion of the alkaline material is readily eliminated without objectionable loss of sugars or sweetening ingredients where desired along with any other undesired impurities by the process disclosed in the co-pending application of the present inventors, Serial No. 430,612, filed February 12, 1942.

A further advantage of the present process is that the use of the fibrous material permits substantially complete extraction of sweetening ingredients from the fruit without requiring the use of large amounts of alkaline material. This not only results in decreasing the cost of the process but in addition by permitting alkaline material to be dispensed with or used only in small quantities, aids in avoiding the danger that the alkaline material may cause loss of sweetening ingredients or cause discoloration of the juice.

Another very important advantage of this process is that the pulp remaining after extraction of the sugar bearing juice is left in a condition where it is highly useful for a variety of purposes, such as, for example, animal feed, fertilizer, etc. As pointed out above, certain methods heretofore used for extracting a sugar bearing liquid from fruit and fruit wastes have left the pulp in a practically useless state. The presence of the fibrous material in the pulp, however, does not render it useless and to the contrary increases its value for certain purposes, for example, as humus filler and fertilizer, and where the fibrous material is sugar bearing it not only adds its quota of sugar but in addition increases the value of the pulp as an animal food or fertilizer.

Furthermore, when alkaline material, particularly lime, is used the pulp is also enhanced in value as fertilizer due to the presence of the lime therein which, as is well known, is a valuable constituent of fertilizer.

It is believed that the presence of the fibrous material gives sufficient body to the mixture to make pressing and filtration possible. When alkaline material is also present it is thought that it aids the separation by cracking the pulp cells to free the juice and by increasing the solubility of the desired sugars or sweetening ingredients in the extraction liquid promoting a more rapid and complete extraction.

The alkaline material is also thought to precipitate certain undesirable water soluble impurities which are left behind in the pulp instead of being carried along with the extracted juice. Thus, the fibrous material and alkaline material when they are used together cooperate in producing a better result.

It is apparent that many widely different embodiments of this invention may be made without departing from the spirit and scope thereof, and therefore it is not intended to be limtied except as indicated in the appended claims.

The invention is hereby claimed as follows:

1. The process of extracting sweetening ingredients from fruit, which comprises pressing the fruit in the form of a finely ground pulp having intimately admixed therewith a substantial quantity of fibrous material and recovering the sweetening ingredients pressed out.

2. The process of extracting sweetening ingredients from fruit, which comprises pressing the fruit in the form of a finely ground pulp having intimately admixed therewith from about 8 per cent to about 30 per cent by weight, based upon the pulp, of a fibrous material and recovering the sweetening ingredients pressed out.

3. The process of extracting sweetening ingredients from fruit, which comprises pressing the fruit in the form of finely ground pulp having intimately admixed therewith a substantial quantity of finely ground fibrous material and recovering the liquid pressed out which contains the sweetening ingredients of the fruit.

4. The process of extracting sweetening ingredients from fruit, which comprises pressing the fruit in the form of finely ground pulp having intimately admixed therewith a substantial quantity of finely ground sugar-containing fibrous material and recovering the liquid pressed out which contains the sweetening ingredients of the fruit.

5. The process of extracting sweetening ingredients from fruit, which comprises pressing the fruit in the form of finely ground pulp having intimately admixed therewith a substantial quantity of finely ground sorghum and recovering the liquid pressed out which contains the sweetening ingredients of the fruit.

6. The process of extracting sweetening ingredients from fruit, which comprises intimately admixing fruit in the form of a finely ground pulp with a substantial quantity of finely ground fibrous material and pressing the resulting mixture and recovering the sweetening ingredients pressed out.

7. The process of extracting sweetening ingredients from fruit, which comprises forming an intimate admixture comprising the fruit in the form of a finely ground pulp and a substantial quantity of finely ground fibrous material, heating said mixture to an elevated temperature below about 170 degrees Fahrenheit and then pressing said mixture and recovering the liquid pressed out which contains the sweetening ingredients of the fruit.

8. The process of extracting sweetening ingredients from fruit, which comprises forming an intimate admixture comprising the fruit in the form of a finely ground pulp, and from about 8 per cent to about 30 per cent by weight, based on the pulp, of finely ground sugar-containing fibrous material, heating said mixture to an elevated temperature below about 170 degrees Fahrenheit and then pressing the mixture and recovering the liquid pressed out which contains the sweetening ingredients of the fruit.

9. The process of extracting sweetening ingredients from fruit, which comprises forming an intimate admixture comprising the fruit in the form of a finely ground pulp and from about 8 per cent to about 30 per cent by weight, based on the pulp, of finely ground sorghum, heating said mixture to an elevated temperature below about 170 degrees Fahrenheit and then pressing the mixture and recovering the liquid pressed out which contains the sweetening ingredients of the fruit.

10. The process of extracting sweetening ingredients from fruit, which comprises pressing the fruit in the form of a finely ground pulp having intimately admixed therewith a substantial quantity of fibrous material and a quantity of alkaline material sufficient to materially promote the extraction of the sweetening ingredients but insufficient to give the extrated liquid containing the sweetening ingredients a pH in excess of about 9 and recovering the sweetening ingredients pressed out.

11. The process of extracting sweetening ingredients from fruit, which comprises pressing the fruit in the form of finely ground pulp having intimately admixed therewith from about 8 per cent to about 30 per cent by weight, based on the pulp, of finely ground sugar-containing fibrous material and a quantity of divalent alkaline material sufficient in cooperation with said fibrous material to bring about substantially complete extraction of the sweetening ingredients present but insufficient to give the extracted liquid containing the sweetening ingredients a pH in excess of about 9 and recovering the liquid pressed out which contains the sweetening ingredients of the fruit.

12. The process of extracting sweetening ingredients from fruit, which comprises pressing the fruit in the form of finely ground pulp having intimately admixed therewith from about 8 per cent to about 30 per cent by weight, based on the pulp, of finely ground sorghum and a quantity of divalent alkaline material sufficient in cooperation with said sorghum to bring about substantially complete extraction of the sweetening ingredients present but insufficient to give the extracted liquid containing the sweetening ingredients a pH in excess of about 9 and recovering the liquid pressed out which contains the sweetening ingredients of the fruit.

13. The process of extracting sweetening ingredients from fruit, which comprises forming an intimate admixture comprising the fruit in the form of a finely ground pulp, from about 8 per cent to about 30 per cent by weight, based on the pulp, of finely ground fibrous material and a quantity of divalent alkaline material sufficient in cooperation with said fibrous material to bring about substantially complete extraction of the sweetening ingredients present but insufficient to give the extracted liquid containing the sweetening ingredients a pH in excess of about 9, heating said mixture to an elevated temperature below about 170 degrees Fahrenheit and then pressing the mixture and recovering the liquid pressed out which contains the sweetening ingredients of the fruit.

14. The process of extracting sweetening ingredients from fruit, which comprises pressing the fruit in the form of a finely ground pulp having intimately admixed therewith a substantial quantity of fibrous material, then washing the filter cake with an aqueous medium to complete the extraction of the sweetening ingredients and recovering the liquid containing the sweetening ingredients so pressed and washed out.

15. The process of extracting sweetening ingredients from fruit, which comprises pressing the fruit in the form of a finely ground pulp having intimately admixed therewith from about 8% to about 30% by weight, based upon the pulp, of a fibrous material, then washing the filter cake with an aqueous medium to complete the extraction of the sweetening ingredients and recovering the liquid containing the sweetening ingredients so pressed and washed out.

ARVID M. ERICKSON.
JOHN D. RYAN.